United States Patent
Zhang et al.

(10) Patent No.: US 12,099,677 B2
(45) Date of Patent: Sep. 24, 2024

(54) TOUCH DISPLAY PANEL AND TOUCH DISPLAY DEVICE

(71) Applicant: Wuhan Tianma Microelectronics Co., Ltd., Wuhan (CN)

(72) Inventors: Wanqiu Zhang, Wuhan (CN); Mengyang Xian, Wuhan (CN); Xin Xiong, Wuhan (CN); Jiancheng Zhao, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 17/849,507

(22) Filed: Jun. 24, 2022

(65) Prior Publication Data

US 2022/0326830 A1  Oct. 13, 2022

(30) Foreign Application Priority Data

Feb. 25, 2022 (CN) ......................... 202210178228.4

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0443* (2019.05); *G06F 3/0446* (2019.05)

(58) Field of Classification Search
CPC .. G06F 3/04164; G06F 3/0412; G06F 3/0443; G06F 3/0446; G06F 2203/04111; G06F 2203/04103; G06F 3/044; G06F 3/041
See application file for complete search history.

(56) References Cited

U.S. PATENT DOCUMENTS

| | | | |
|---|---|---|---|
| 2016/0274398 A1* | 9/2016 | Hirakata | G06F 3/0448 |
| 2018/0032204 A1* | 2/2018 | Imazeki | G06F 3/04164 |
| 2018/0122871 A1* | 5/2018 | Choi | G06F 3/0412 |
| 2018/0329552 A1* | 11/2018 | Song | G06F 3/044 |
| 2022/0206620 A1* | 6/2022 | Lee | G06F 3/0446 |
| 2022/0236849 A1* | 7/2022 | Li | G06F 3/0443 |
| 2023/0195267 A1* | 6/2023 | Tan | G06F 3/0443 |
| | | | 345/174 |

FOREIGN PATENT DOCUMENTS

| | | | |
|---|---|---|---|
| CN | 109742106 A | | 5/2019 |
| CN | 110970470 A | | 4/2020 |
| CN | 113687737 A | * | 11/2021 |

* cited by examiner

*Primary Examiner* — Md Saiful A Siddiqui
(74) *Attorney, Agent, or Firm* — KDW Firm PLLC

(57) ABSTRACT

Provided a touch display panel and a touch display device. The touch display panel includes a signal transmission layer, an insulation layer, and a touch layer disposed in stack in a thickness direction of the touch display panel. The insulation layer is provided with insulation openings penetrating therethrough, and the touch layer is electrically connected to the signal transmission layer through the insulation openings. The insulation openings include a first opening close to a side of the signal transmission layer and a second opening close to a side of the touch layer, and an opening area of the first opening is larger than an opening area of the second opening. The touch display panel provided can increase the contact area between the touch layer and the signal transmission layer, ensure reliability and stability of the connection, and improve the process yield and touch performance of the display panel.

17 Claims, 9 Drawing Sheets

TOUCH DISPLAY PANEL AND TOUCH DISPLAY DEVICE

CROSS-REFERENCE TO RELATED APPLICATION

This application claims priority to Chinese Patent Application No. 202210178228.4 filed Feb. 25, 2022, the disclosure of which is incorporated herein by reference in its entirety.

FIELD

Embodiments of the present disclosure relates to the field of display technologies, and more particularly to a touch display panel and a touch display device.

BACKGROUND

A touch display panel is a display panel which combines a touch panel and a display panel and has functions of both displaying and perceiving a touch input. In order to realize the touch function, generally, it is necessary to bridge between different film layers, and it is prone to be subjected to poor contact, which may adversely affect the touch performance of the display panel.

SUMMARY

It is provided according to embodiments of the present disclosure a touch display panel and a touch display device to solve the problem of poor contact caused by bridging between different film layers.

It is provided according to embodiments of the present disclosure a touch display panel including a signal transmission layer, an insulation layer, and a touch layer which are disposed in stack in a thickness direction of the touch display panel.

The insulation layer is provided with insulation openings penetrating through the insulation layer, and the touch layer is electrically connected to the signal transmission layer through the insulation opening.

The insulation openings include a first opening close to a side of the signal transmission layer and a second opening close to a side of the touch layer, and an opening area of the first opening is larger than an opening area of the second opening.

It is further provided according to embodiments of the present disclosure a touch display device including a touch display panel, where the touch display panel includes a signal transmission layer, an insulation layer, and a touch layer which are disposed in stack in a thickness direction of the touch display panel. The insulation layer is provided with insulation openings penetrating through the insulation layer, and the touch layer is electrically connected to the signal transmission layer through the insulation opening. The insulation openings includes a first opening close to a side of the signal transmission layer and a second opening close to a side of the touch layer, and an opening area of the first opening is larger than an opening area of the second opening.

BRIEF DESCRIPTION OF DRAWINGS

In order that technical solutions in embodiments of the present disclosure or the related art are described more clearly, drawings to be used in the description of the embodiments or the related art are briefly described hereinafter. Apparently, while the drawings in the description are some embodiments of the present disclosure, for those skilled in the art, these drawings may be expanded and extended to other structures and drawings according to the basic concepts disclosed or taught in embodiments of the present disclosure. These are undoubtedly all within the scope of the claims of the present disclosure.

DETAILED DESCRIPTION

The technical solutions of the present disclosure will be described clearly and completely with reference to the accompanying drawings in the embodiments, from which the object, technical solutions and advantages of the present disclosure will be clearer. Apparently, the embodiments described below are part, not all, of the embodiments of the present disclosure. All other embodiments acquired by those skilled in the art based on basic concepts disclosed or taught in the embodiments of the present disclosure fall within the scope of protection of the present disclosure.

It is provided according to embodiments of the present disclosure a touch display panel including a signal transmission layer, an insulation layer, and a touch layer which are disposed in stack in a thickness direction of the touch display panel. The insulation layer is provided with insulation openings penetrating through the insulation layer, and the touch layer is electrically connected to the signal transmission layer through the insulation opening. The insulation openings include a first opening close to a side of the signal transmission layer and a second opening close to a side of the touch layer, and an opening area of the first opening is larger than an opening area of the second opening.

In the touch display panel according to the embodiments of the present disclosure, by providing that the insulation openings in the insulation layer includes the first opening close to the side of the signal transmission layer and the second opening close to the side of the touch layer, and the area of the first opening is larger than the area of the second opening, thereby a bottom area of the insulation openings can be increased, a contact area between the touch layer and the signal transmission layer can be increased, a contact resistance between the touch layer and the signal transmission layer can be reduced, reliability and stability of connection between the touch layer and the signal transmission layer can be ensured, and process yield and touch performance of the display panel can be improved.

The technical solutions in the embodiments of the present disclosure are described hereinafter with reference to the drawings in the embodiments of the present disclosure.

Figure 1:
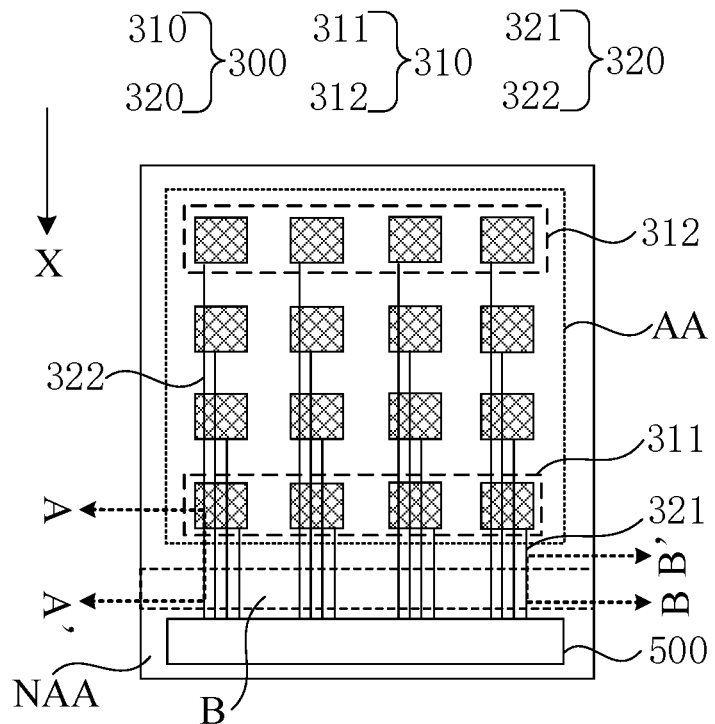
FIG. 1 is a schematic top view of a touch display panel according to embodiments of the present disclosure.
Figure 2:
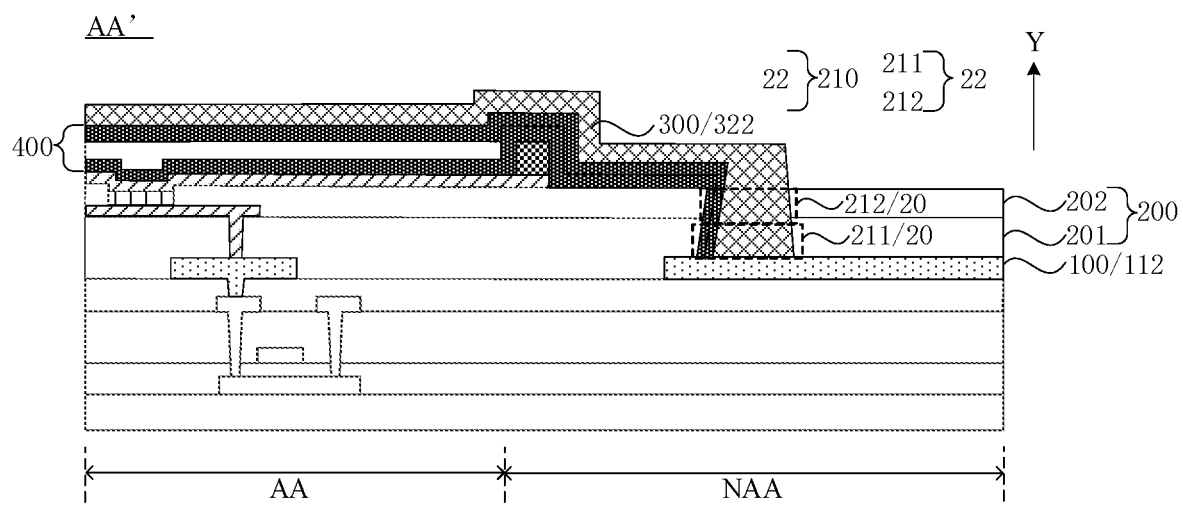
FIG. 2 is a schematic cross-sectional view of the touch display panel in FIG. 1 taken along a sectional line AA'.
Figure 3:
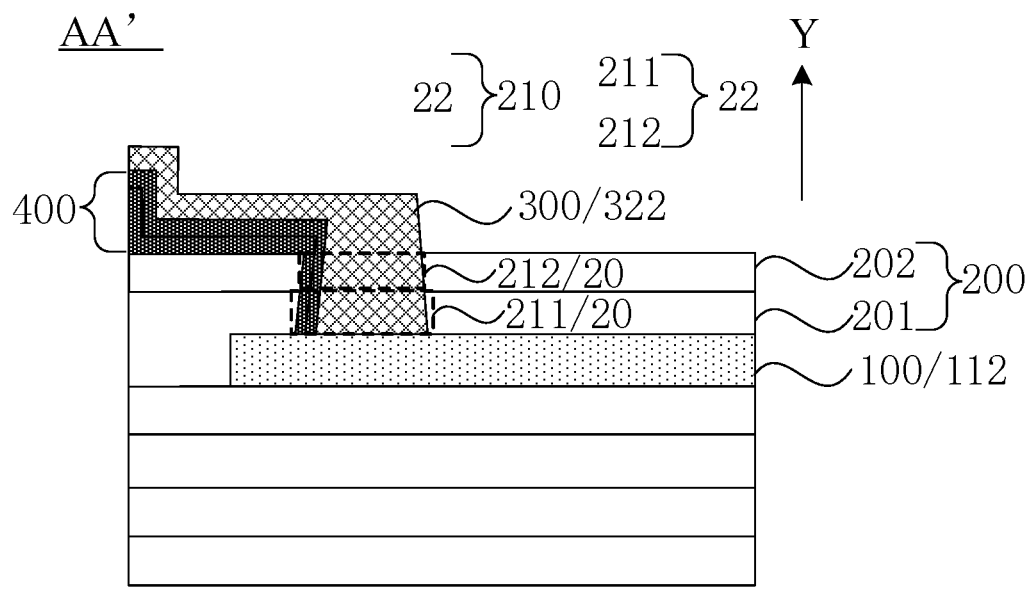
FIG. 3 is a schematic partially-enlarged view of a non-display region of the touch display panel in FIG. 2.

FIG. 1 is a schematic top view of a touch display panel according to embodiments of the present disclosure; FIG. 2 is a schematic cross-sectional view of the touch display panel in FIG. 1 taken along a sectional line AA'; and FIG. 3 is a schematic partially-enlarged view of a non-display region of the touch display panel in FIG. 2. With reference to FIG. 1 to FIG. 3, a touch display panel 10 according to embodiments of the present application includes a signal transmission layer 100, an insulation layer 200, and a touch layer 300 which are disposed in stack in a thickness direction Y of the touch display panel 10. The insulation layer 200 is provided with insulation openings 210 penetrating through the insulation layer 200, and the touch layer 300 is electrically connected to the signal transmission layer 100 through the insulation openings 210. The insulation openings 210 include a first opening 211 close to a side of the signal transmission layer 100 and a second opening 212 close to a side of the touch layer 300, and an opening area of the first opening 211 is larger than an opening area of the second opening 212.

As an example, with reference to FIG. 1 and FIG. 2, the touch display panel 10 according to the embodiments of the present disclosure includes the signal transmission layer 100, the insulation layer 200, and the touch layer 300. The touch layer 300 is a film layer for implementing a touch function. The signal transmission layer 100 is a film layer capable of transmitting electrical signals. In order to prevent different electrical signals from interfering each other, the insulation layer 200 is provided between the touch layer 300 and the signal transmission layer 100. The touch layer 300 is electrically connected to the signal transmission layer 100 through the insulation openings 210 penetrating through the insulation layer 200, thereby realizing the touch function of the touch display panel 10. The insulation openings 210 include the first opening 211 close to the side of the signal transmission layer 100 and the second opening 212 close to the side of the touch layer 300, and the area of the first opening 211 is larger than the area of the second opening 212, that is, the insulation openings 210 is an opening structure having a small opening on an upper side and a large opening on a lower side, in this way, a bottom area of the insulation openings 210 can be increased, and thereby, a contact area between the touch layer 300 and the signal transmission layer 100 can be increased, a contact resistance between the touch layer 300 and the signal transmission layer 100 can be reduced, and poor contact can be prevented, the electrical connection between the touch layer 300 and the signal transmission layer 100 can be ensured, and reliability and stability of the electric connection can be improved, and process yield and touch performance of the display panel can be improved.

It is to be noted that, as shown in FIG. 2, the touch display panel 10 may include a substrate, a gate, a gate insulation layer, an active layer, an interlayer insulation layer, a source-drain layer (a second metal layer), a planarization layer, a third metal layer, a pixel defining layer, an anode, a light emitting layer, a cathode, a thin film encapsulation layer, and the like. The third metal layer is commonly used as a jumper layer for connection between the second metal layer and the anode, and may also be used as a high power supply voltage signal line to transmit PVDD signals. In some embodiments, the signal transmission layer 100 may be a third metal layer, and the insulation layer 200 may be any one or more film layers between the signal transmission layer 100 and the touch layer 300. For example, in a case where the signal transmission layer 100 is a third metal layer, the insulation layer 200 may be a pixel defining layer.

It is further to be noted that, the specific arrangements of the touch layer 300 is not limited by the embodiments of the present disclosure. The touch layer 300 may be a touch layer of a self-capacitance structure shown in FIG. 1, or may be a touch layer of a mutual-capacitance structure. No matter the touch layer is the touch layer of the self-capacitance structure or the touch layer of the mutual-capacitance structure, the touch layer 300 always needs to transmit touch signals through the signal transmission layer 100 to ensure that the touch layer 300 can normally implement the touch function.

In the touch display panel according to the embodiments of the present disclosure, by providing that the insulation openings in the insulation layer includes the first opening close to the side of the signal transmission layer and the second opening close to the side of the touch layer, and that the area of the first opening is larger than the area of the second opening, a bottom area of the insulation openings can be increased, a contact area between the touch layer and the signal transmission layer can be increased, a contact resistance between the touch layer and the signal transmission layer can be reduced, reliability and stability of connection between the touch layer and the signal transmission layer can be ensured, and process yield and touch performance of the display panel can be improved.

Figure 4:
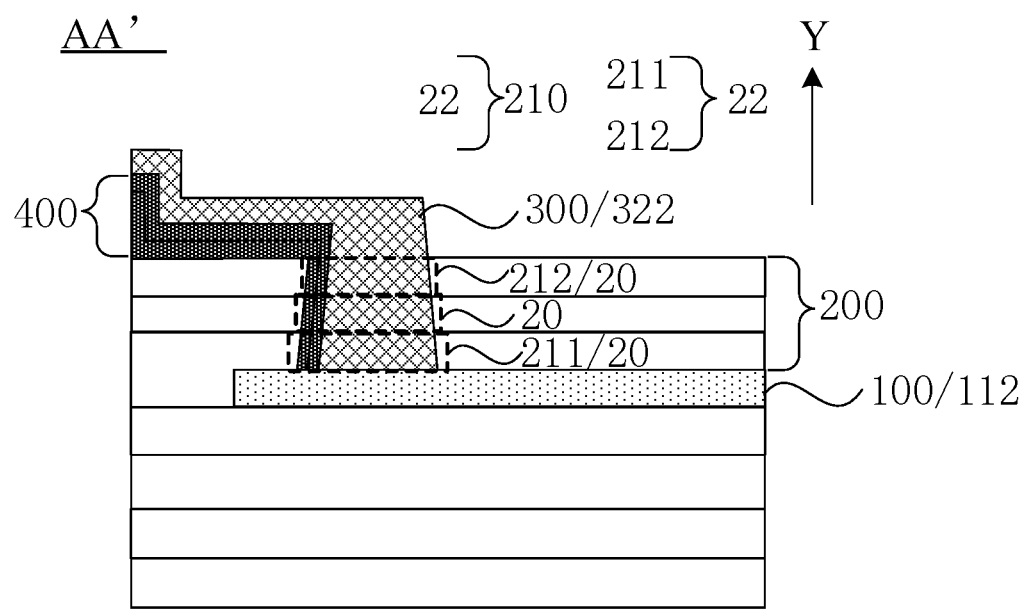
FIG. 4 is a schematic cross-sectional view of the non-display region of the touch display panel in FIG. 1 taken along the sectional line AA'.

FIG. 4 is a schematic cross-sectional view of the non-display region of the touch display panel in FIG. 1 taken along the sectional line AA'. As shown in FIG. 4, in some embodiments, in the thickness direction Y of the touch display panel 10, the insulation layer 200 includes multiple sub-insulation-layers disposed in stack, and the insulation openings 210 include sub-insulation-openings 20 arranged in any one of the sub-insulation-layers; in any two of the sub-insulation-openings 20, an opening area of the sub-insulation-opening 20 close to the side of the signal transmission layer 100 is larger than an opening area of the sub-insulation-opening 20 far away from the side of the signal transmission layer 100.

Referring to FIG. 4, the insulation layer 200 is a multiple film layer structure including multiple sub-insulation-layers, each of the sub-insulation-layers is provided with a sub-insulation-opening 20 penetrating through a respective subinsulation-layer, and among the multiple sub-insulation-openings 20, an opening area of the sub-insulation-opening 20 close to the side of the signal transmission layer 100 is larger than an opening area of the sub-insulation-opening 20 far away from the side of the signal transmission layer 100, that is, in the thickness direction Y of the touch display panel 10, the opening area of the insulation openings 210 is gradually reduced, and a cross-sectional shape of the insulation openings 210 in a direction parallel to the thickness direction Y of the touch display panel 10 is trapezoidal. In this way, the contact area between the touch layer 300 and the signal transmission layer 100 can be increased, and moreover, the process flow can be simplified, the preparation difficulty can be reduced, and the production efficiency can be improved.

Referring to FIG. 2 and FIG. 3, in some embodiments, the multiple sub-insulation-layers include a first sub-insulation-layer 201 close to the side of the signal transmission layer 100 and a second sub-insulation-layer 202 locating on a side of the first sub-insulation-layer 201 far away from the signal transmission layer 100; and the first sub-insulation-layer 201 includes a planarization layer, and the second sub-insulation-layer 202 includes a pixel defining layer.

As an example, the insulation layer 200 in this embodiment includes two sub-insulation-layers (a first sub-insulation-layer 201 and a second sub-insulation-layer 202), where the first sub-insulation-layer 201 may be a planarization layer and the second sub-insulation-layer may be a pixel defining layer. By providing that the area of the opening in the sub-insulation-layer of the planarization layer close to the side of the signal transmission layer 100 is larger than the area of the opening 20 in the sub-insulation-layer of the pixel defining layer far away from the side of the signal transmission layer 100, a bottom area of the opening formed in the insulation layer can be increased, a contact area between the touch layer 300 and the signal transmission layer 100 can be increased, reliability and stability of the connection between the touch layer 300 and the signal transmission layer 100 can be ensured, and process yield and touch performance of the display panel can be improved.

It should be noted that FIG. 2 and FIG. 3 show the insulation layer 200 including the two sub-insulation-layers and the two sub-insulation-layers being respectively the planarization layer and the pixel defining layer only for example rather than limiting. The number and specific structure of the sub-insulation-layers may be provided by the person skilled in the art according to practical requirements, which are not limited by the embodiments of the present disclosure.

Referring to FIG. 1 and FIG. 2, in some embodiments, the touch display panel 10 includes a display region AA and a non-display region NAA located on at least one side of the display region AA, and the insulation openings 210 is located in a part, at the non-display region NAA, of the insulation layer 200. The touch display panel 10 further includes an encapsulation layer 400 between the insulation layer 200 and the touch layer 300, and the encapsulation layer 400 covers the display region AA and an edge of the encapsulation layer 400 covers part of the insulation openings 210.

In TPOT (Touch Panel On TFE, i.e., touch panel on thin film encapsulation layer) technology, the touch layer 300 is prepared on the thin film encapsulation layer 400. Compared with the conventional touch display panel, in TPOT technology, the touch structure and the display structure are disposed in stack, so that mutual interference between touch and display can be avoided, and the display effect and the touch effect can be improved. Further, since the touch structure and the display structure are not arranged in the same layer, traces in the touch structure and traces in the display structure are respectively arranged in different film layers. For example, in the thickness direction of the touch display panel, the traces in the touch structure and the traces in the display structure may overlap, which may facilitate the implementation of a narrow bezel. Referring to FIG. 2, in the TPOT technology, before the touch layer 300 is electrically connected to the signal transmission layer 100 in a lapping manner through the insulation openings 210 penetrating through the insulation layer 200, the encapsulation layer 400 may be deposited first. In order to ensure that the encapsulation layer 400 can completely encapsulate and protect the display region AA, it is required that the encapsulation layer 400 has a certain extension length in the non-display region. Since being adversely affected by the process, the encapsulation layer 400 is apt to cover the insulation openings 210, so that the contact area between the touch layer 300 and the signal transmission layer 100 becomes small, and in a case where the encapsulation layer 400 is thick, the contact resistance between the touch layer 300 and the signal transmission layer 100 is too large, which may cause an problem of poor contact, and have a significant adverse effect on the process yield and the performance of touch. The touch display panel 10 according to the embodiments of the present disclosure employs TPOT technology, and can effectively address the poor contact problem caused by the encapsulation layer 400 covering the insulation openings 210.

The touch display panel 10 includes a display region AA and a non-display region NAA, and the insulation openings 210 is located in the part, at the non-display region NAA, of the insulation layer 200. The encapsulation layer 400 is located between the insulation layer 200 and the touch layer 300, and the encapsulation layer 400 covers the display region AA to protect the display panel from being eroded by external water and oxygen. In the practical process, an edge of the encapsulation layer 400 may inevitably extend from the display region AA to the non-display region NAA and cover part of the insulation openings 210. By providing that the area of the first opening 211 close to the side of the signal transmission layer 100 in the insulation openings 210 is larger than the area of the second opening 212 close to the side of the touch layer 300 in the insulation openings 210, that is, the insulation openings 210 is a trapezoid-like opening structure having a small upper opening and a large lower opening, so that the encapsulation layer 400 may be deposited only in an edge region of the bottom surface of the insulation openings 210 without covering a central region of the bottom surface of the insulation openings 210. In this way, the encapsulation layer 400 can be effectively prevented from completely covering the insulation openings 210, and the bottom area of the insulation openings 210 can be increased, thereby the contact area between the touch layer 300 and the signal transmission layer 100 can be increased, the contact resistance between the touch layer 300 and the signal transmission layer 100 can be reduced, the poor contact can be avoided, the reliability and stability of the connection between the touch layer 300 and the signal transmission layer 100 can be ensured, and the process yield and the touch performance of the display panel can be effectively improved.

It is to be noted that the positions of the display region AA and the non-display region NAA are not limited in the embodiments of the present disclosure, and may be designed according to practical conditions.

In the touch display panel according to the embodiments of the present disclosure, by providing that the insulation openings in the insulation layer includes the first opening close to the side of the signal transmission layer and the second opening close to the side of the touch layer, and the area of the first opening is larger than the area of the second opening, the edge of the encapsulation only covers the edge region of the bottom surface of the insulation openings rather than covering the central region of the bottom surface of the insulation opening, thereby, the encapsulation can be effectively prevented from completely covering the insulation opening, and the bottom area of the insulation openings can be increased, the contact area between the touch layer and the signal transmission layer can be increased, the contact resistance between the touch layer and the signal transmission layer can be reduced, the reliability and stability of the connection between the touch layer and the signal transmission layer can be ensured, and the process yield and the touch performance of the display panel can be effectively improved.

Referring to FIG. 2 and FIG. 3, on the basis of the above embodiments, in some embodiments, the encapsulation layer 400 includes at least one inorganic insulation layer.

The encapsulation layer 400 may include only one inorganic insulation layer, or may include multiple inorganic insulation layers, for example, the encapsulation layer 400 may be a three-film-layer structure including an inorganic insulation layer, an organic insulation layer, and an inorganic insulation layer (referring to FIG. 2 and FIG. 3), and any structure of the encapsulation layer 400 having an encapsulation effect falls within the protection scope of the present disclosure. Since the encapsulation layer 400 includes at least one inorganic insulation layer, and the inorganic insulation layer is generally prepared by a chemical vapor deposition process, and due to the process, an edge of the inorganic insulation layer may inevitably extend from the display region AA to the non-display region NAA and cover part of the insulation openings 210. The insulation openings is formed in such a shape as having a large lower part and a small upper part in the insulation layer, so that the inorganic insulation layer extending to the non-display region NAA covers only the edge region of the bottom surface of the insulation opening, and does not cover the central region of the bottom surface of the insulation opening, thereby, the contact area between the touch layer and the signal transmission layer can be increased, the contact resistance between the touch layer and the signal transmission layer can be reduced, the reliability and stability of the connection between the touch layer and the signal transmission layer can be ensured, and the process yield and the touch performance of the display panel can be effectively improved.

Figure 5:
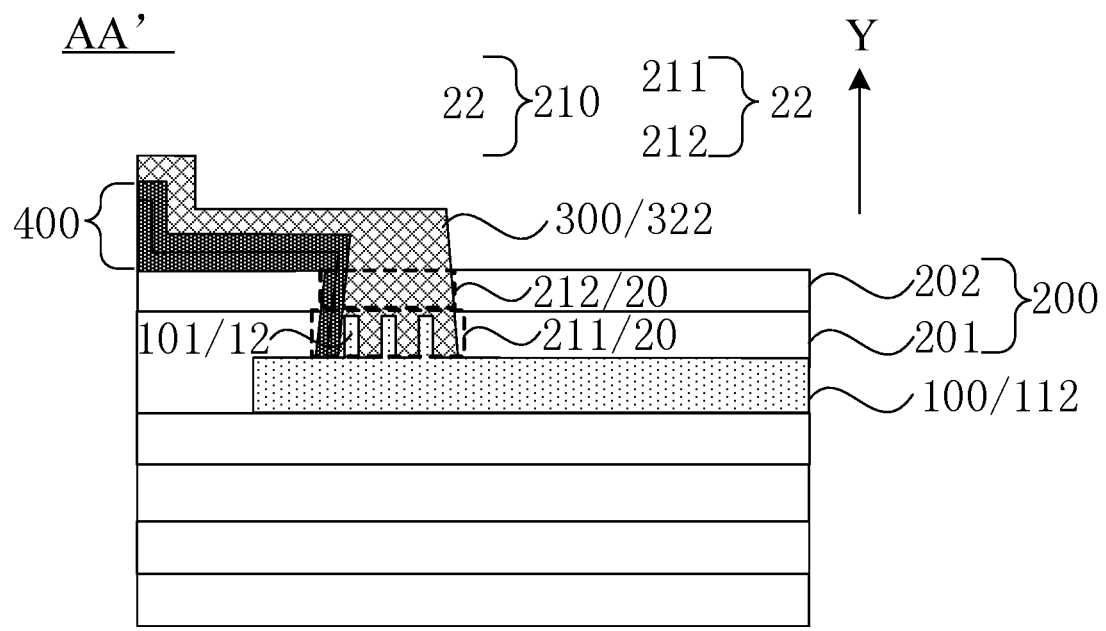
FIG. 5 is another schematic partially-enlarged view of the non-display region of the touch display panel in FIG. 2.

FIG. 5 is another schematic partially-enlarged view of the non-display region of the touch display panel in FIG. 2. As shown in FIG. 5, in some embodiments, a surface, close to the insulation layer 200, of the signal transmission layer 100 is provided with a concave-convex structure 101; and the touch layer 300 is electrically connected to the concave-convex structure 101 through the insulation openings 210.

As an example, referring to FIG. 5, the surface, close to the insulation layer 200, of the signal transmission layer 100 is provided with the concave-convex structure 101. Compared with a planar structure, the concave-convex structure 101, in one aspect, can increase the contact area between the signal transmission layer 100 and the touch layer 300, and in another aspect, can prevent the encapsulation layer 400 from being deposited on top of the concavo-convex structure 101 due to the serrated structure of the concavo-convex structure 101, so that the area of the insulation openings 210 covered by the encapsulation layer 400 can be further reduced, and the reliability and stability of the connection between the touch layer 300 and the signal transmission layer 100 can be effectively improved, and process yield and touch performance of the display panel can be improved.

Figure 6:
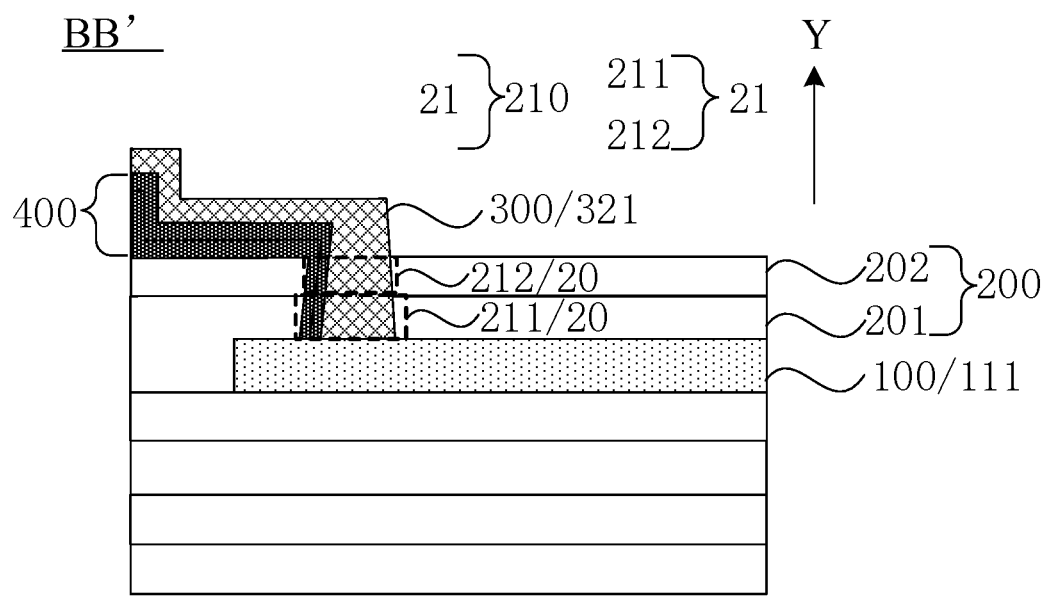
FIG. 6 is a schematic cross-sectional view of the touch display panel in FIG. 1 taken along a sectional line BB'.

FIG. 6 is a schematic cross-sectional view of the touch display panel in FIG. 1 taken along a sectional line BB'. With reference to FIG. 1, FIG. 3 and FIG. 6, in some embodiments, the touch layer 300 includes touch electrodes 310 and touch traces 320. The touch electrodes 310 include a first touch electrode 311 and a second touch electrode 312, the touch traces 320 include a first touch trace 321 and a second touch trace 322, the first touch electrode 311 is electrically connected to the first touch trace 321, and the second touch electrode 312 is electrically connected to the second touch trace 322. The signal transmission layer 100 includes a touch jumper wire 110, the touch jumper wire 110 includes a first touch jumper wire 111 and a second touch jumper wire 112, and the insulation openings 210 include a first insulation opening 21 and a second insulation opening 22. The first touch trace 321 is electrically connected to the first touch jumper wire 111 through the first insulation opening 21, and the second touch trace 322 is electrically connected to the second touch jumper wire 112 through the second insulation opening 22. The touch display panel 10 further includes a touch drive chip 500, the first touch electrode 311 is located on a side, close to the touch drive chip 500, of the second touch electrode 312, and a contact area between the first touch trace 321 and the first touch jumper wire 111 is smaller than a contact area between the second touch trace 322 and the second touch jumper wire 112.

The touch electrode 310 is electrically connected to the signal transmission layer 100 through the touch trace 320 and the touch jumper wire 110. The signal transmission layer 100 transmits a touch signal to the touch electrodes 310 electrically connected thereto to implement the touch function. Since the distances between the touch drive chip 500 and different touch electrodes 310 may be different, the lengths of the touch traces 320 electrically connected to the touch electrodes 310 may be different, and when the length of a touch trace 320 is larger, the resistance of the touch trace is greater. When the same touch signal is transmitted by the signal transmission layer 100 through the touch traces 320 with different lengths, due to different touch trace resistances, the touch signals reaching the touch electrodes 310 in electrical connection with the touch traces 320, may be different and thus the touch effect may be adversely affected. In order to balance the difference in touch signals caused by the touch traces 320 with different lengths, contact areas between the touch jumper wires 110 and the touch traces 320 can be reasonably set.

In some embodiments, for convenience of explanation, the touch electrodes 310 are divided into a first touch electrode 311 and a second touch electrode 312. The first touch electrode 311 and the second touch electrode 312 are different in distance from the touch drive chip 500. The first touch electrode 311 is located close to the side of the touch drive chip 500, of the second touch electrode 312, that is, the distance between the second touch electrode 312 and the touch drive chip 500 is greater than the distance between the first touch electrode 311 and the touch drive chip 500. The first touch electrode 311 is electrically connected to the first touch jumper wire 111 of the signal transmission layer 100 by the first touch trace 321, and the second touch electrode 312 is electrically connected to the second touch jumper wire 112 of the signal transmission layer 100 by the second touch trace 322. Since the distance between the second touch electrode 312 and the touch drive chip 500 is larger than the distance between the first touch electrode 311 and the touch drive chip 500, the length of the second touch trace 322 is larger than that of the first touch trace 321, and the touch trace resistance of the second touch trace 322 is larger than that of the first touch trace 321. In this case, a contact area between the second touch trace 322 and the second touch jumper wire 112 is larger than a contact area between the first touch trace 321 and the first touch jumper wire 111, that is, the contact area between the touch trace 320 with a large touch trace resistance and the touch jumper wire 110 correspondingly connected thereto is greater than the contact area between the touch trace 320 with a small touch trace resistance and the touch jumper wire 110 correspondingly connected thereto, so as to balance the touch signals transmitted with the touch traces 320 having different lengths (touch trace resistances), and improve the touch performance of the touch display panel 10.

It is to be noted that the touch electrodes 310 including two types of touch electrodes 310 having different distances from the touch drive chip 500, that is, the first touch electrode 311 and the second touch electrode 312 are only taken as an example in the above description. The person skilled in the art may determine the number of types of the touch electrodes 310 having different distances from the touch drive chip 500 according to practical situations, as long as it can be ensured that a contact area between the touch trace 320 electrically connected to the touch electrode 310 far away from the touch drive chip 500 having a large touch trace resistance and the touch jumper wire 110 correspondingly connected to this touch trace 320 is larger than a contact area between the touch trace 320 electrically connected to the touch electrode 310 near the touch drive chip 500 having a small touch trace resistance and the touch jumper wire 110 correspondingly connected to this touch trace 320.

Referring to FIG. 1, FIG. 3, and FIG. 6, in some embodiments, the touch layer 300 includes multiple touch electrodes 310, and distances from any two touch electrodes 30 to the touch drive chip 500 are different. The touch layer 300 further includes multiple touch traces 320; and the touch traces 320 and the touch electrodes 310 are in a one to one correspondence, and any two of the touch traces 320 have different extension lengths in a first direction X. The first direction X intersects the thickness direction Y of the touch display panel 10. The signal transmission layer 100 includes multiple touch jumper wires 110, and the touch jumper wires 110 and the touch traces 320 are in a one to one correspondence. In any two of the touch traces 320, a contact area between the touch trace 320 having a long extension length in the first direction X and the touch jumper wire 110 corresponding thereto is larger than a contact area between the touch trace 320 having a short extension length in the first direction X and the touch jumper wire 110 corresponding thereto.

For convenience of explanation, FIG. 1 shows only for example that the touch electrodes 310 include four types of touch electrodes 310 having different distances from the touch drive chip 500. The lengths of the touch traces 320 correspondingly connected to the touch electrodes 310 having gradually decreased distances from the touch drive chip 500 are sequentially reduced. Then, the touch trace resistances corresponding to the above touch traces 320 are sequentially reduced. In order to balance the touch signals transmitted through the touch traces 320 having different lengths or different touch trace resistances, contact areas between the above touch traces 320 and the touch jumper wires 110 correspondingly connected to the touch traces 320 can be set to be sequentially reduced, that is, the contact area between the touch trace 320 having a long length and its corresponding touch jumper wire 110 is set to be larger than the contact area between the touch trace 320 having a short length and its corresponding touch jumper wire 110.

Figure 7:
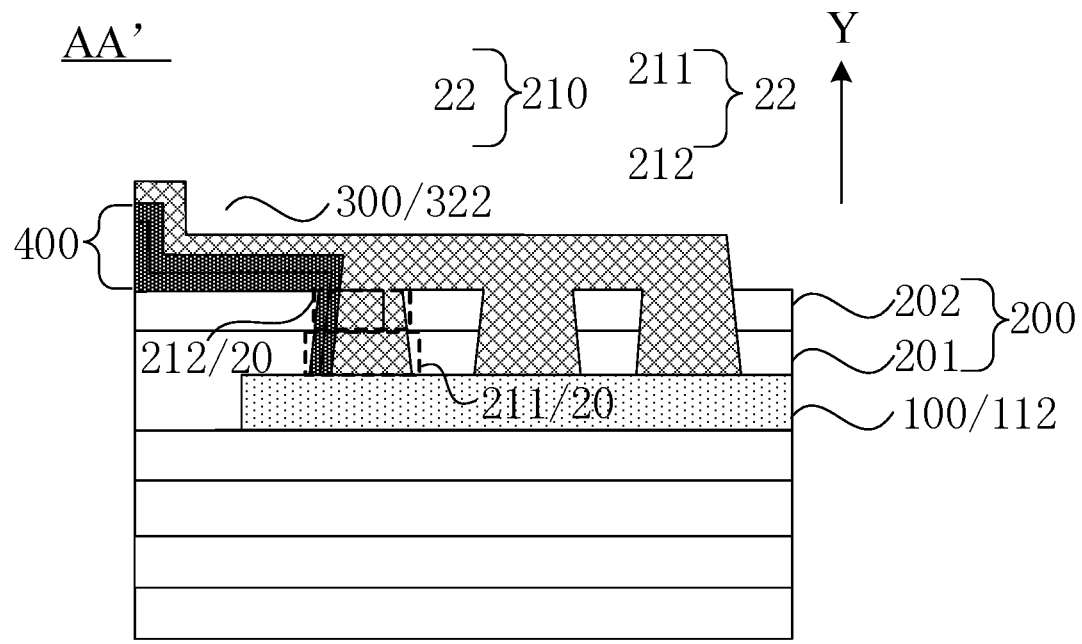
FIG. 7 is still another schematic partially-enlarged view of the non-display region of the touch display panel in FIG. 2.

FIG. 7 is still another schematic partially-enlarged view of the non-display region of the touch display panel in FIG. 2, for example, with reference to FIG. 1, FIG. 3, FIG. 6 and FIG. 7, in some embodiments, an opening area of the first opening 211 in the first insulation opening 21 is smaller than an opening area of the first opening 211 in the second insulation opening 22; and/or the number of openings of the first insulation opening 21 is smaller than the number of openings of the second insulation opening 22.

Referring to FIG. 1, FIG. 3 and FIG. 6, and with reference to the above description, the length (touch trace resistance) of the second touch trace 322 is larger than the length (touch trace resistance) of the first touch trace 321. Therefore, in order to balance the touch signals transmitted through the second touch trace 322 and the first touch trace 321, the contact area between the second touch trace 322 and the second touch jumper wire 112 is required to be larger than the contact area between the first touch trace 321 and the first touch jumper wire 111. For this purpose, the opening area of the first opening 211 in the second insulation opening 22 exposing the second touch jumper wire 112 may provide larger than the opening area of the first opening 211 in the first insulation opening 21 exposing the first touch jumper wire 111.

Referring to FIG. 1, FIG. 6, and FIG. 7, further, for enabling the contact area between the second touch trace 322 and the second touch jumper wire 112 to be larger than the contact area between the first touch trace 321 and the first touch jumper wire 111, it may also provide the number of openings of the second insulation opening 22 exposing the second touch jumper wire 112 to be greater than the number of openings of the first insulation opening 21 exposing the first touch jumper wire 111. That is, on the basis that the opening areas of the first insulation opening 21 and the second insulation opening 22 are the same, the difference in the contact area can be achieved by providing different numbers of openings of the insulation openings 210.

Figure 8:
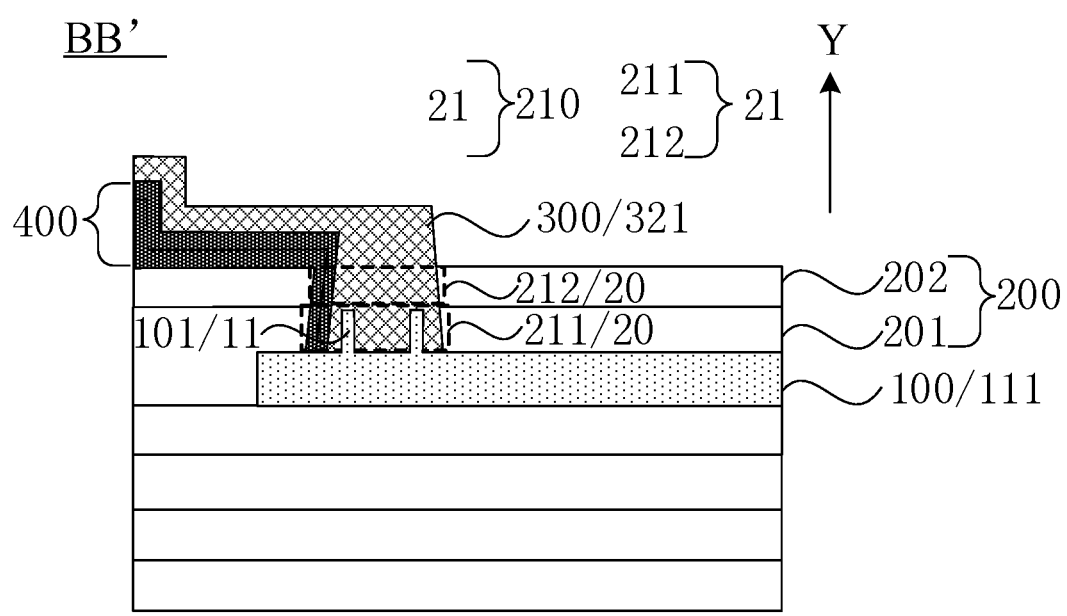
FIG. 8 is another schematic cross-sectional view of the touch display panel in FIG. 1 taken along the sectional line BB'.
Figure 9:
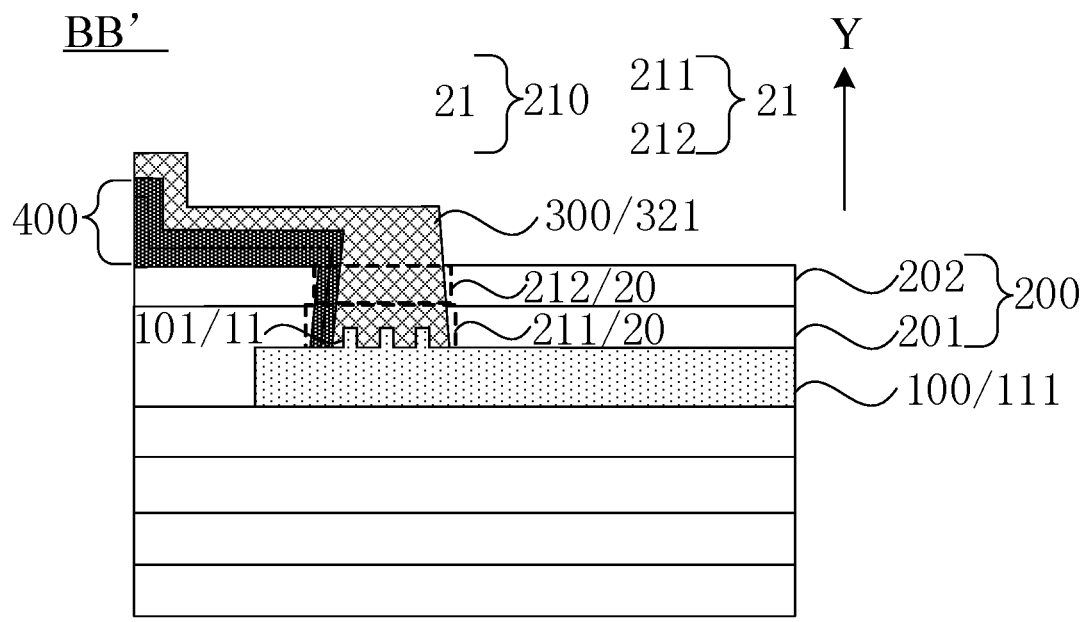
FIG. 9 is still another schematic cross-sectional view of the touch display panel in FIG. 1 taken along the sectional line BB'.

FIG. 8 is another schematic cross-sectional view of the touch display panel in FIG. 1 taken along the sectional line BB'; FIG. 9 is still another schematic cross-sectional view of the touch display panel in FIG. 1 taken along the sectional line BB'. With reference to FIG. 5, FIG. 8 and FIG. 9, in some embodiments, a surface, close to the insulation layer 200, of the first touch jumper wire 111 is provided with a first concave-convex structure 11, and a surface, close to the insulation layer 200, of the second touch jumper wire 112 is provided with a second concave-convex structure 12, the first touch trace 321 is electrically connected to the first concave-convex structure 11 through the first insulation opening 21, and the second touch trace 322 is electrically connected to the second concave-convex structure 12 through the second insulation opening 22. The first concave-convex structure 11 includes multiple first convex portions, and the second concave-convex structure 12 includes multiple second convex portions; within a unit area, a distribution density of the first convex portions is smaller than a distribution density of the second convex portions; and/or a first convex portion has a height smaller than a second convex portion.

With reference to the above description, the length (touch trace resistance) of the second touch trace 322 is larger than the length (touch trace resistance) of the first touch trace 321. Therefore, in order to balance the touch signals transmitted through the second touch trace 322 and the first touch trace 321, the contact area between the second touch trace 322 and the second touch jumper wire 112 is required to be larger than the contact area between the first touch trace 321 and the first touch jumper wire 111. On the basis that the surface, close to the insulation layer 200, of the touch jumper wire 110 is provided with the concave-convex structure 101 (the first concave-convex structure 11 and the second concave-convex structure 12), the contact area can be adjusted by providing the distribution density of the convex portions or the height of the convex portions in the concave-convex structure 101. With reference to FIG. 5 and FIG. 8, it may provide that, within a unit area, a distribution density of the second convex portions in the second concave-convex structure 12 electrically connected to the second touch trace 322 is greater than a distribution density of the first convex portions in the first concave-convex structure 11 electrically connected to the first touch trace 321. In addition, with reference to FIG. 5 and FIG. 9, it may further provide that the height of the second convex portions in the second concave-convex structure 12 electrically connected to the second touch trace 322 is larger than the height of the first convex portions in the first concave-convex structure 11 electrically connected to the first touch trace 321.

Figure 10:
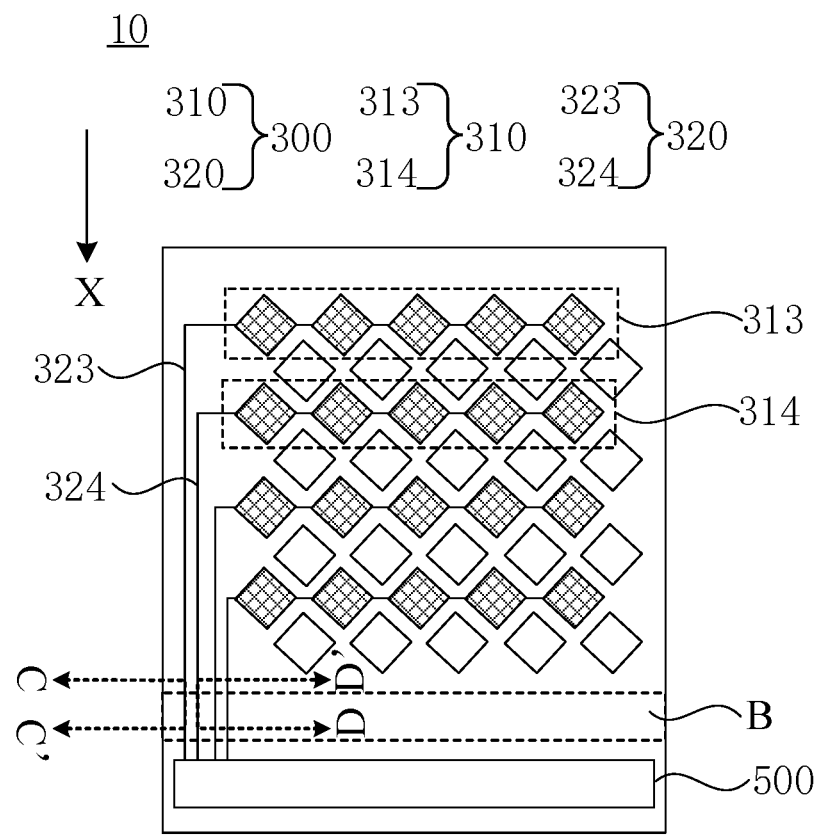
FIG. 10 is another schematic top view of a touch display panel according to embodiments of the present disclosure.
Figure 11:
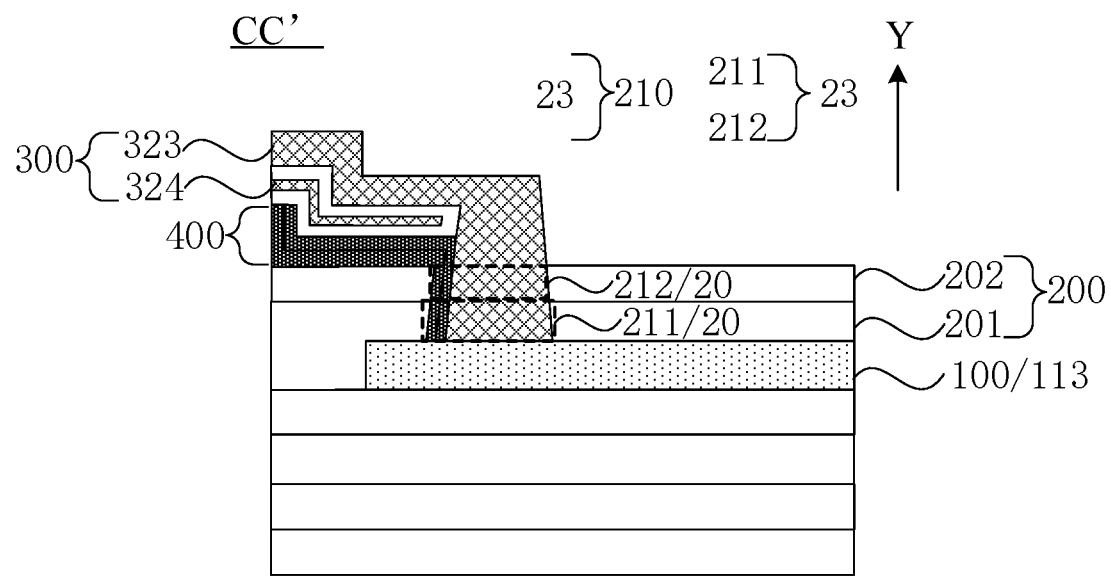
FIG. 11 is a schematic cross-sectional view of the touch display panel in FIG. 10 taken along a sectional line CC'.
Figure 12:
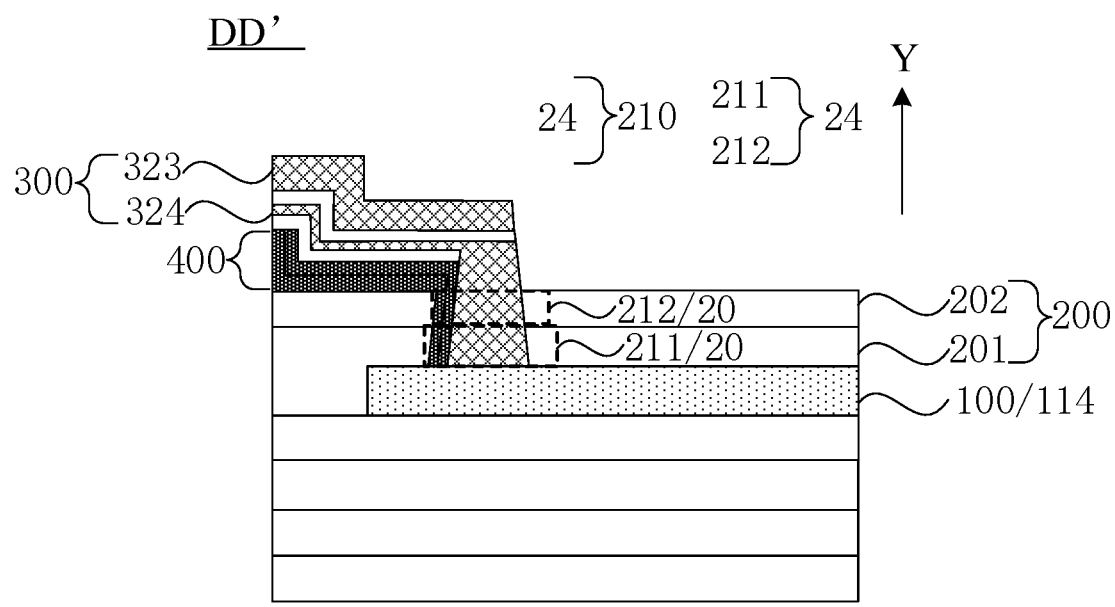
FIG. 12 is a schematic cross-sectional view the touch display panel in FIG. 10 taken along a sectional line DD'.

FIG. 10 is another schematic top view of a touch display panel according to embodiments of the present disclosure, FIG. 11 is a schematic cross-sectional view of the touch display panel in FIG. 10 taken along a sectional line CC', and FIG. 12 is a schematic cross-sectional view the touch display panel in FIG. 10 taken along a sectional line DD'. With reference to FIG. 10, FIG. 11 and FIG. 12, in some embodiments, the touch layer 300 includes touch electrodes 310 and touch traces 320, the touch electrodes 310 include a third touch electrode 313 and a fourth touch electrode 314, the touch traces 320 include a third touch trace 323 and a fourth touch trace 324, the third touch electrode 313 is electrically connected to the third touch trace 323, and the fourth touch electrode 314 is electrically connected to the fourth touch trace 324. The third touch trace 323 and the fourth touch trace 324 are arranged in different layers, and a resistivity of the third touch trace 323 is greater than a resistivity of the fourth touch trace 324. The signal transmission layer 100 includes a third touch jumper wire 113 and a fourth touch jumper wire 114, the insulation openings 210 include a third insulation opening 23 and a fourth insulation opening 24, the third touch trace 323 is electrically connected to the third touch jumper wire 113 through the third insulation opening 23, and the fourth touch trace 324 is electrically connected to the fourth touch jumper wire 114 through the fourth insulation opening 24. A contact area between the third touch trace 323 and the third touch jumper wire 113 is larger than a contact area between the fourth touch trace 324 and the fourth touch jumper wire 114.

In order to realize a narrow bezel design, the third touch trace 323 and the fourth touch trace 324 may be located in different film layers, and a vertical projection of the third touch trace 323 on a plane where the touch display panel 10 is located may overlap a vertical projection of the fourth touch trace 324 on a plane where the touch display panel 10 is located, or they may be close to each other. The third touch trace 323 and the fourth touch trace 324 in different film layers are made from different materials, and the resistivity of the third touch trace 323 and the sheet resistivity of the fourth touch trace 324 are different, therefore, when the signal transmission layer 100 transmits a touch signal to each of the third touch trace 323 and the fourth touch trace 324, the touch signal reaching the third touch electrode 313 and the touch signal reaching the fourth touch electrode 314 may also be different. To balance the touch signals transmitted through the touch traces with different resistivities, it may provide that the contact areas between the signal transmission layer 100 and the touch traces 320 having different resistivities are different. In some embodiments, in a case where the resistivity of the third touch trace 323 is greater than the resistivity of the fourth touch trace 324, it may provide that a contact area between the third touch trace 323 and the third touch jumper wire 113 is larger than a contact area between the fourth touch trace 324 and the fourth touch jumper wire 114, that is, the contact area between the touch trace 320 having a large resistivity and the touch jumper wire 110 correspondingly connected to this touch trace is larger than the contact area between the touch trace 320 having a small resistivity and the touch jumper wire correspondingly connected to this touch trace. In this way, the touch signals transmitted through the touch traces 320 having different resistivities are balanced, and also the width of the bezel region can be reduced, thereby realizing the narrow bezel design.

Figure 13:
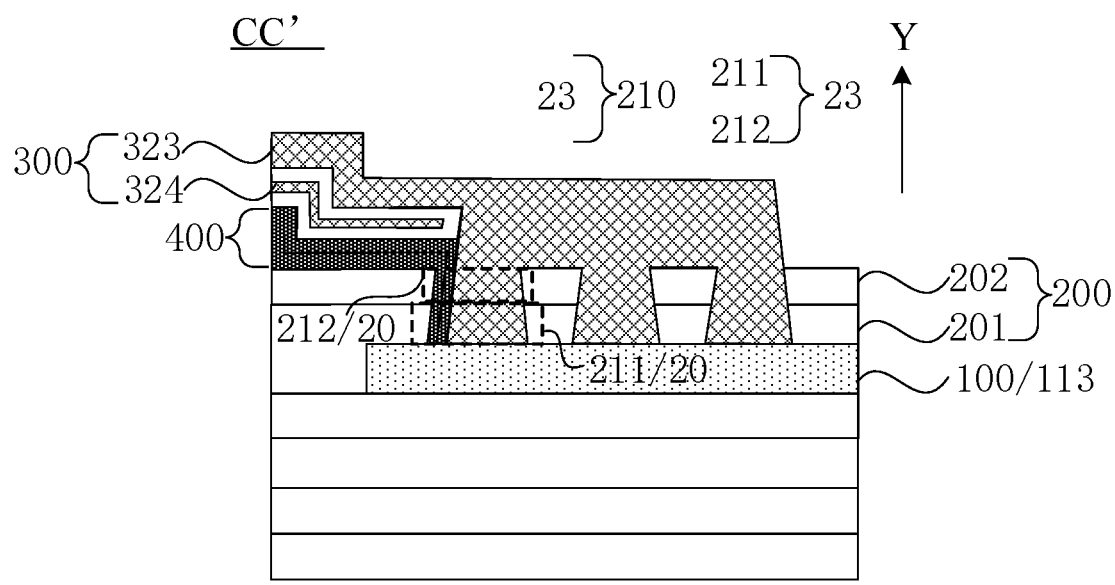
FIG. 13 is another schematic cross-sectional view of the touch display panel in FIG. 10 taken along the sectional line CC'.

FIG. 13 is another schematic cross-sectional view of the touch display panel in FIG. 10 taken along the sectional line CC'. With reference to FIG. 11 to FIG. 12, on the basis of the above embodiments, in some embodiments, an opening area of the first opening 211 in the third insulation opening 23 is larger than an opening area of the first opening 211 in the fourth insulation opening 24; and/or the number of openings of the third insulation opening 23 is greater than the number of openings of the fourth insulation opening 24.

For enabling the contact area between the third touch trace 323 having a large resistivity and the third touch jumper wire 113 to be larger than the contact area between the fourth touch trace 324 having a small resistivity and the fourth touch jumper wire 114, referring to FIG. 11 and FIG. 12, it may provide that an opening area of the first opening 211 in the third insulation opening 23 exposing the third touch jumper wire 113 is larger than an opening area of the first opening 211 in the fourth insulation opening 24 exposing the fourth touch jumper wire 114. In addition, with reference to FIG. 12 and FIG. 13, it may also provide that the number of openings of the third insulation opening 23 exposing the third touch jumper wire 113 is greater than the number of openings of the fourth insulation opening 24 exposing the fourth touch jumper wire 114. That is, on the basis that the opening areas of the third insulation opening 23 and the fourth insulation opening 24 are the same, different contact areas may be realized by providing different number of openings of the insulation openings 210.

Figure 14:
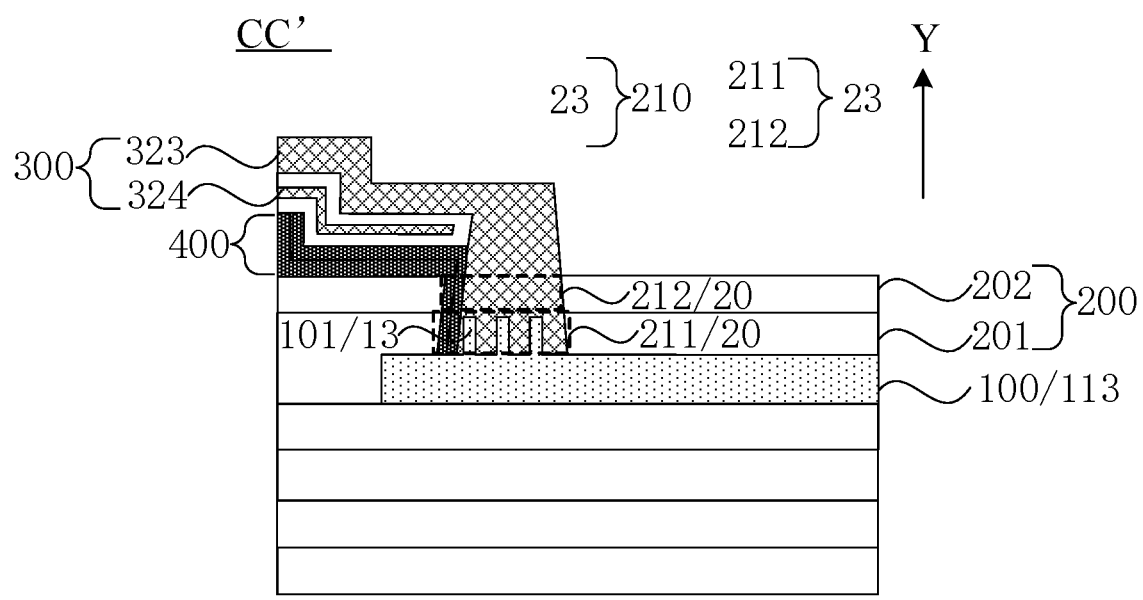
FIG. 14 is still another schematic cross-sectional view of the touch display panel in FIG. 10 taken along the sectional line CC'.
Figure 15:
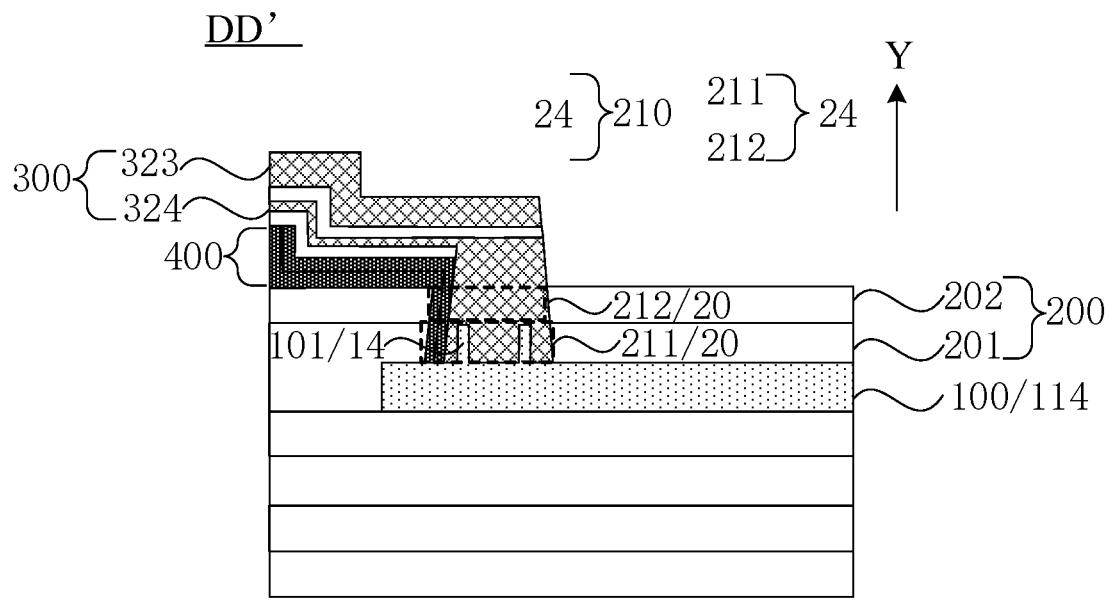
FIG. 15 is another schematic cross-sectional view of the touch display panel in FIG. 10 taken along the sectional line DD'.
Figure 16:
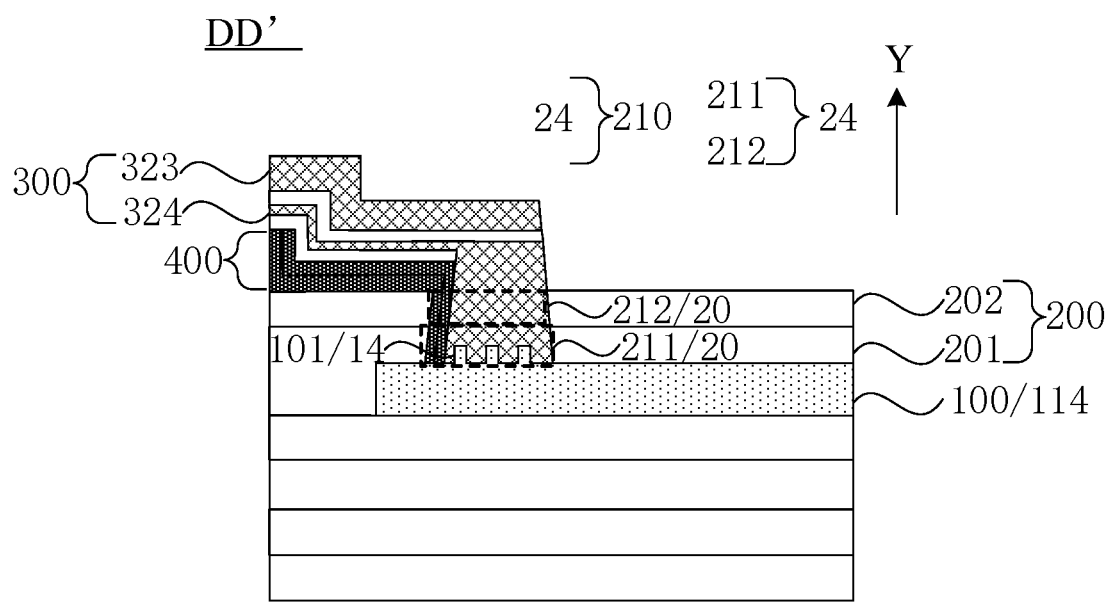
FIG. 16 is still another schematic cross-sectional view of the touch display panel in FIG. 10 taken along the sectional line DD'.

FIG. 14 is still another schematic cross-sectional view of the touch display panel in FIG. 10 taken along the sectional line CC', FIG. 15 is another schematic cross-sectional view of the touch display panel in FIG. 10 taken along the sectional line DD', and FIG. 16 is still another schematic cross-sectional view of the touch display panel in FIG. 10 taken along the sectional line DD'. As an example, with reference to FIG. 14 to FIG. 16, in some embodiments, a surface, close to the insulation layer 100, of the third touch jumper wire 113 is provided with a third concave-convex structure 13, and a surface, close to the insulation layer 100, of the fourth touch jumper wire 114 is provided with a fourth concave-convex structure 14, the third touch trace 323 is electrically connected to the third concave-convex structure 13 through the third insulation opening 23, and the fourth touch trace 324 is electrically connected to the fourth concave-convex structure 14 through the fourth insulation opening 24. The third concave-convex structure 13 includes multiple third convex portions, and the fourth concave-convex structure 14 includes multiple fourth convex portions. Within a unit area, a distribution density of the third convex portions is greater than a distribution density of the fourth convex portions; and/or a third convex portion has a height greater than a fourth convex portion.

In order to balance the touch signals transmitted through the third touch trace 323 and the fourth touch trace 324, the contact area between the third touch trace 323 and the third touch jumper wire 113 is required to be larger than the contact area between the fourth touch trace 324 and the fourth touch jumper wire 114. On the basis that the surface, close to the insulation layer 200, of the touch jumper wire 110 is provided with the concave-convex structure 101 (the third concave-convex structure 13 and the fourth concave-convex structure 14), the contact area can be adjusted by providing the distribution density of the convex portions or the height of the convex portions in the concave-convex structure 101. With reference to FIG. 14 and FIG. 15, it may provide that, within a unit area, a distribution density of the third convex portions in the third concave-convex structure 13 electrically connected to the third touch trace 323 is greater than a distribution density of the fourth convex portions in the fourth concave-convex structure 14 electrically connected to the fourth touch trace 324. In addition, with reference to FIG. 14 and FIG. 16, it may further provide that the height of the third convex portions in the third concave-convex structure 13 electrically connected to the third touch trace 323 is larger than the height of the fourth convex portions in the fourth concave-convex structure 14 electrically connected to the fourth touch trace 324.

With reference to FIG. 1 and FIG. 2, in some embodiments, the touch display panel 10 includes a step region B; and at least in the step region B, the touch layer 300 is electrically connected to the signal transmission layer 100 through the insulation openings 210.

The step region B is located in a non-display region NAA of the display panel, where insulation openings 210 are formed to realize the electrical connection of the touch layer 300 to the signal transmission layer 100 in a lapping manner, which will not adversely affect the display function of the display region AA. It will be understood that those skilled in the art may also provide insulation openings 210, to realize the electrical connection of the touch layer 300 to the signal transmission layer 100 in a lapping manner, in regions other than the step region B according to practical requirements, which is not limited by the embodiments of the present disclosure.

Figure 17:
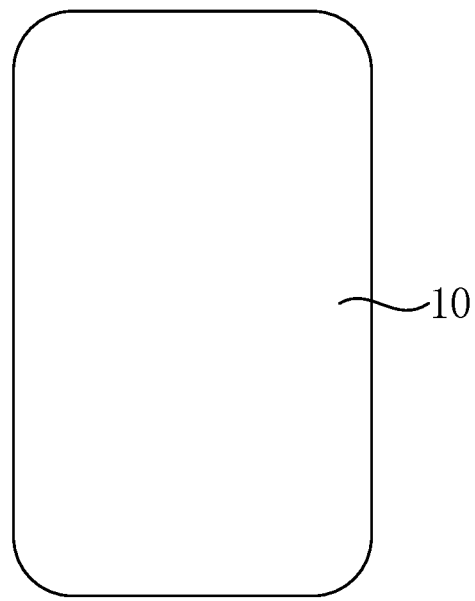
FIG. 17 is a schematic view showing the structure of a touch display device according to embodiments of the present disclosure.

A touch display device is further provided according to embodiments of the present disclosure. FIG. 17 is a schematic structural view of a touch display device according to embodiments of the present disclosure. As shown in FIG. 17, the touch display device includes the touch display panel 10 according to any embodiment of the present disclosure, and has functions and beneficial effects corresponding to the touch display panels 10.

It is to be noted that embodiments in the specification are described in a progressive manner. Each embodiment focuses on its differences from other embodiments. The same or similar parts in the embodiments can be referred to from each other.

It is to be noted that the above are merely preferred embodiments of the present disclosure and technical prin-ciples used therein. It can be understood by those skilled in the art that the present disclosure is not limited to the particular embodiments described herein. Various apparent modifications, adaptations, combinations and substitutions cam be made for those skilled in the art without departing from the scope of the present disclosure. Therefore, while the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. A touch display panel, comprising a signal transmission layer, an insulation layer, a touch layer and an encapsulation layer which are disposed in stack in a thickness direction of the display panel, wherein the encapsulation layer is located between the insulation layer and the touch layer, the touch layer comprises at least one touch electrode and at least one touch trace, and the signal transmission layer comprises at least one touch jumper wire;

the insulation layer is provided with insulation openings penetrating through the insulation layer, and the touch layer is electrically connected to the signal transmission layer through the insulation openings; and the insulation openings comprise a first opening close to a side of the signal transmission layer and a second opening close to a side of the touch layer, wherein an edge of the encapsulation layer covers a portion of the first opening and a portion of the second opening, and an opening area of the first opening is larger than an opening area of the second opening, wherein the touch layer comprises touch electrodes and touch traces;

the touch electrodes comprise a first touch electrode and a second touch electrode, the touch traces comprise a first touch trace and a second touch trace, the first touch electrode is electrically connected to the first touch trace, and the second touch electrode is electrically connected to the second touch trace;

the signal transmission layer comprises touch jumper wires, the touch jumper wires comprise a first touch jumper wire and a second touch jumper wire, and the insulation openings comprise a first insulation opening and a second insulation opening; the first touch trace is electrically connected to the first touch jumper wire through insulation opening, and the second touch trace is electrically connected to the second touch jumper wire through the second insulation opening; and wherein a surface, close to the insulation layer, of the first touch jumper wire is provided with a first concave-convex structure, and a surface, close to the insulation layer, of the second touch jumper wire is provided with a second concave-convex structure, the first touch trace is electrically connected to the first concave-convex structure through the first insulation opening, and the second touch trace is electrically connected to the second concave-convex structure through the second insulation opening; and the first concave-convex structure comprises a plurality of first convex portions, and the second concave-convex structure comprises a plurality of second convex portions; within a unit area, the first convex portions and the second convex portions satisfy at least one of: a distribution density of the plurality of first convex portions is smaller than a distribution density of the plurality of second convex portions, or, a first convex portion of the plurality of first convex portions has a height smaller than a second convex portion of the plurality of second convex portions.

2. The touch display panel according to claim 1, wherein in the thickness direction of the touch display panel, the insulation layer comprises a plurality of sub-insulation-layers disposed in a stack, and the insulation openings comprise sub-insulation-openings arranged in each of the sub-insulation-layers;

in two of the sub-insulation-openings, an opening area of the sub-insulation-opening close to the side of the signal transmission layer is larger than an opening area of the sub-insulation-opening far away from the side of the signal transmission layer.

3. The touch display panel according to claim 2, wherein the plurality of sub-insulation-layers comprise a first sub-insulation-layer close to a side of the signal transmission layer and a second sub-insulation-layer locating on a side of the first sub-insulation-layer far away from the signal transmission layer; and the first sub-insulation-layer comprises a planarization layer, and the second sub-insulation-layer comprises a pixel defining layer.

4. The touch display panel according to claim 1, wherein a surface, close to the insulation layer, of the signal transmission layer is provided with a concave-convex structure; and the touch layer is electrically connected to the concave-convex structure through the insulation openings.

5. The touch display panel according to claim 1, wherein the touch display panel further comprises a touch drive chip; the first touch electrode is located on a side, close to the touch drive chip, of the second touch electrode, and a contact area between the first touch trace and the first touch jumper wire is smaller than a contact area between the second touch trace and the second touch jumper wire.

6. The touch display panel according to claim 5, wherein the touch layer comprises a plurality of touch electrodes, and distances from any two of the plurality of touch electrodes to the touch drive chip are different;

the touch layer further comprises a plurality of touch traces, wherein the plurality of touch traces and the plurality of touch electrodes are in a one to one correspondence, and any two of the plurality of touch traces have different extension lengths in a first direction, the first direction intersects the thickness direction of the touch display panel;

the signal transmission layer comprises a plurality of touch jumper wires, the plurality of touch jumper wires and the plurality of touch traces are in a one to one correspondence; and in two of the plurality of touch traces, a contact area between a touch trace having a long extension length in the first direction and a corresponding touch jumper wire is larger than a contact area between a touch trace having a short extension length in the first direction and a corresponding touch jumper wire.

7. The touch display panel according to claim 5, wherein the touch display panel satisfies at least one of: an opening area of the first opening in the first insulation opening is smaller than an opening area of the first opening in the second insulation opening; or, a number of openings of the first insulation opening is smaller than a number of openings of the second insulation opening.

8. The touch display panel according to claim 1, wherein the first touch trace and the second touch trace are arranged in different layers, and a resistivity of the first touch trace is greater than a resistivity of the second touch trace; and a contact area between the first touch trace and the first touch jumper wire is larger than a contact area between the second touch trace and the second touch jumper wire.

9. The touch display panel according to claim 1, wherein the touch display panel comprises a display region and a non-display region located on at least one side of the display region, and the insulation openings is located in a part, at the non-display region, of the insulation layer, and the encapsulation layer covers the display region.

10. The touch display panel according to claim 9, wherein the encapsulation comprises at least one inorganic insulation layer.

11. The touch display panel according to claim 1, wherein the touch display panel comprises a step region; and at least in the step region, the touch layer is electrically connected to the signal transmission layer through the insulation openings.

12. A touch display device comprising a touch display panel, wherein the touch display panel comprises:

a signal transmission layer, an insulation layer, a touch layer and an encapsulation layer which are disposed in stack in a thickness direction of the display panel, wherein the encapsulation layer is located between the insulation layer and the touch layer, the touch layer comprises at least one touch electrode and at least one touch trace, and the signal transmission layer comprises at least one touch jumper wire;

the insulation layer is provided with insulation openings penetrating through the insulation layer, and the touch layer is electrically connected to the signal transmission layer through the insulation openings; and the insulation openings comprise a first opening close to a side of the signal transmission layer and a second opening close to a side of the touch layer, wherein an edge of the encapsulation layer covers a portion of the first opening and a portion of the second opening, and an opening area of the first opening is larger than an opening area of the second opening;

wherein the touch layer comprises touch electrodes and touch traces;

the touch electrodes comprise a first touch electrode and a second touch electrode, the touch traces comprise a first touch trace and a second touch trace, the first touch electrode is electrically connected to the first touch trace, and the second touch electrode is electrically connected to the second touch trace;

the signal transmission layer comprises touch jumper wires, the touch jumper wires comprise a first touch jumper wire and a second touch jumper wire, and the insulation openings comprise a first insulation opening and a second insulation opening; the first touch trace is electrically connected to the first touch jumper wire through the first insulation opening, and the second touch trace is electrically connected to the second touch jumper wire through the second insulation opening; and wherein a surface close to the insulation layer, of the first touch jumper wire is provided with a first concave-convex structure, and a surface, close to the insulation layer, of the second touch jumper wire is provided with a second concave-convex structure, the first touch trace is electrically connected to the first concave-convex structure through the first insulation opening, and the second touch trace is electrically connected to the second concave-convex structure through the second insulation opening, and the first concave-convex structure comprises a plurality of first convex portions, and the second concave-convex structure comprises a plurality of second convex portions, within a unit area, the first convex portions and the second convex portions satisfy at least one of: a distribution density of the plurality of first convex portions is smaller than a distribution density of the plurality of second convex portion; or, a first convex portion of the plurality of second convex portions.

13. The touch display device according to claim 12, wherein in the thickness direction of the touch display panel, the insulation layer comprises a plurality of sub-insulation-layers disposed in a stack, and the insulation openings comprise sub-insulation-openings arranged in each of the sub-insulation-layers;

in two of the sub-insulation-openings, an opening area of the sub-insulation-opening close to the side of the signal transmission layer is larger than an opening area of the sub-insulation-opening far away from the side of the signal transmission layer.

14. The touch display device according to claim 12, wherein a surface, close to the insulation layer, of the signal transmission layer is provided with a concave-convex structure; and the touch layer is electrically connected to the concave-convex structure through the insulation openings.

15. The touch display device according to claim 12, wherein the touch layer comprises touch electrodes and touch traces;

the touch electrodes comprise a first touch electrode and a second touch electrode, the touch traces comprise a first touch trace and a second touch trace, the first touch electrode is electrically connected to the first touch trace, and the second touch electrode is electrically connected to the second touch trace;

the signal transmission layer comprises touch jumper wires, the touch jumper wires comprise a first touch jumper wire and a second touch jumper wire, and the insulation openings comprise a first insulation opening and a second insulation opening; the first touch trace is electrically connected to the first touch jumper wire through the first insulation opening, and the second touch trace is electrically connected to the second touch jumper wire through the second insulation opening; and the touch display panel further comprises a touch drive chip; the first touch electrode is located on a side, close to the touch drive chip, of the second touch electrode, and a contact area between the first touch trace and the first touch jumper wire is smaller than a contact area between the second touch trace and the second touch jumper wire.

16. The touch display device according to claim 15, wherein the touch layer comprises a plurality of touch electrodes, and distances from any two of the plurality of touch electrodes to the touch drive chip are different;

the touch layer further comprises a plurality of touch traces, wherein the plurality of touch traces and the plurality of touch electrodes are in a one to one correspondence, and any two of the plurality of touch traces have different extension lengths in a first direction, the first direction intersects the thickness direction of the touch display panel;

the signal transmission layer comprises a plurality of touch jumper wires, the plurality of touch jumper wires and the plurality of touch traces are in a one to one correspondence; and in two of the plurality of touch traces, a contact area between a touch trace having a long extension length in the first direction and a corresponding touch jumper wire is larger than a contact area between a touch trace having a short extension length in the first direction and a corresponding touch jumper wire.

17. The touch display device according to claim 15, wherein the touch display panel satisfies at least one of: an opening area of the first opening in the first insulation opening is smaller than an opening area of the first opening in the second insulation opening; or, a number of openings of the first insulation opening is smaller than a number of openings of the second insulation opening.

* * * * *